United States Patent
Montenegro

(10) Patent No.: US 8,069,470 B1
(45) Date of Patent: Nov. 29, 2011

(54) IDENTITY AND AUTHENTICATION IN A WIRELESS NETWORK

(75) Inventor: Gabriel E. Montenegro, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1121 days.

(21) Appl. No.: 11/104,828

(22) Filed: Apr. 13, 2005

(51) Int. Cl.
*G06F 7/04* (2006.01)

(52) U.S. Cl. .................................. 726/3; 726/6

(58) Field of Classification Search .................. None
See application file for complete search history.

(56) References Cited

U.S. PATENT DOCUMENTS

| | | | | |
|---|---|---|---|---|
| 5,548,646 A * | 8/1996 | Aziz et al. | ....... | 713/153 |
| 7,000,012 B2 * | 2/2006 | Moore et al. | ....... | 709/220 |
| 7,024,548 B1 * | 4/2006 | O'Toole, Jr. | ....... | 713/1 |
| 7,111,100 B2 * | 9/2006 | Ellerbrock | ....... | 710/300 |
| 7,398,394 B1 * | 7/2008 | Johnsen et al. | ....... | 713/168 |
| 2004/0174904 A1 * | 9/2004 | Kim et al. | ....... | 370/475 |
| 2005/0144437 A1 * | 6/2005 | Ransom et al. | ....... | 713/151 |
| 2005/0271210 A1 * | 12/2005 | Soppera | ....... | 380/277 |
| 2006/0174322 A1 * | 8/2006 | Turner et al. | ....... | 726/3 |
| 2007/0198675 A1 * | 8/2007 | Amanuddin et al. | ....... | 709/223 |

* cited by examiner

*Primary Examiner* — Nasser Moazzami
*Assistant Examiner* — Carlton Johnson
(74) *Attorney, Agent, or Firm* — Osha • Liang LLP

(57) ABSTRACT

A sensor system includes a controller and sensors, the system configured to ensure unique identity for each device. Methods are provided to generate new identities for those devices having duplicate addresses, and to transmit the new identity information to those devices.

18 Claims, 6 Drawing Sheets

IDENTITY AND AUTHENTICATION IN A WIRELESS NETWORK

BACKGROUND

Sensor systems exist in everyday life, measuring temperature, determining moisture content, determining the chemical content of soil, etc. Such systems often include sensors coupled to a sensor controller. The sensor is used to provide sensory data or other information to the sensor controller, and the sensor controller operates on that information in some manner.

Many of these sensor systems are configured to use a physical link, such as a wire or other physical device, coupling the sensors and the controller. Other sensor systems are wireless means to transfer information between sensors and sensor controllers.

SUMMARY

In general, in one aspect, the invention relates to a method for secure configuration of a sensor system includes receiving a join request from a new sensor including identity information, and determining whether the identity information provided by the new sensor is unique within the sensor system. If the network identity information is not unique within the system, new identity information is generated and sent to the new sensor.

In general, in one aspect, the invention relates to a sensor system includes a sensor controller wirelessly coupled to a first sensor having an identifier. The sensor controller is configured to receive a join request having identity information from a new sensor. Once the join request is received, the controller determines whether the identity information provided by the new sensor is unique within the sensor system, and to generate new identity information for the new sensor, if the identity information provided by the new sensor is not unique.

Other aspects of the invention will be apparent from the following description and the appended claims.

DETAILED DESCRIPTION

Figure 1:
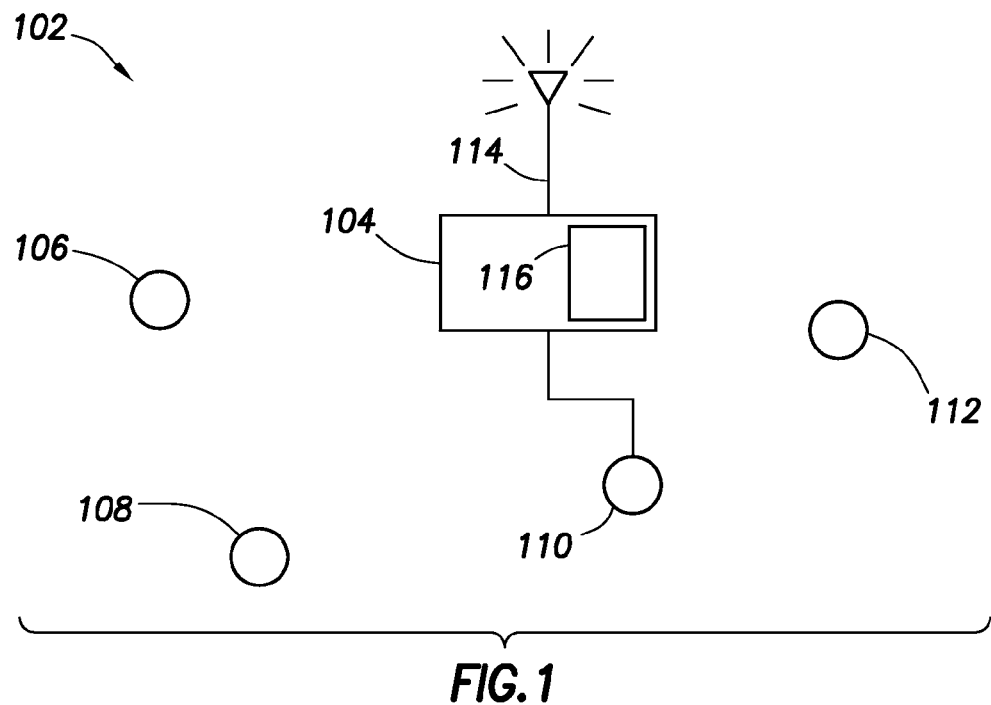
FIG. 1 shows a functional block diagram of a wireless sensor system according to one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a wireless sensor network and a method for adding and removing sensors from that network is provided. In one or more embodiments of the invention, management of a sensor network includes a method for identifying and authenticating new sensors being added to a wireless network.

In one or more embodiments of the invention, management of a sensor network includes a method for adding new sensors to a wireless network and for removing sensors from the wireless network, the adding and removing operations providing backward data secrecy and forward data secrecy respectively for the entire sensor system.

FIG. 1 shows a functional block diagram of a wireless sensor system according to the invention. In one or more embodiments of the invention, sensor system 102 includes controller 104 and sensors 106, 108, 110, and 112. Sensors 106, 108, and 112 are wireless, and thus receive information from and transmit information to one or more wireless devices (e.g., to and from controller 104, from one sensor to another, etc.) using wireless means, such as radio frequency. Persons of ordinary skill in the art having the benefit of this disclosure will readily understand how to employ wireless transmission with sensor systems. In one or more embodiments of the invention, sensor 110 is a traditional wire-based sensor, and is physically coupled to controller 104.

Controller 104 includes antenna 114, used to transmit information to and receive information from sensors 106, 108, and 112. Controller 104 may further include storage media 116 within which a system list (not shown) is stored, including a list of active and authenticated sensors in the sensor system 102, sensors that are not yet activated but which are authorized, etc. Other information provided in the system list may include, but is not limited to, a capability list for one or more sensors in the sensor system 102, the status of one or more sensors in sensor system 102, etc.

Controller 104 is configured to manage sensor communication and to act on information provided by sensors, e.g., sensors 106, 108, 110, and 112. In one or more embodiments of the invention, controller 104 may be instantiated as a state machine incorporated into a larger system. Alternatively, in one or more embodiments of the invention, controller 104 should be thought of as a set of functions, rather than a particular device. Thus, functions performed by a controller, such as controller 104, may be incorporated into one or more sensors or other devices which may operate to perform one or more functions normally thought of as relating to a controller, in addition to performing functions normally attributed to sensors, such as monitoring environmental conditions and providing data to other devices.

In one or more embodiments of the invention, in order to securely establish a sensor system, e.g., sensor system 102, an initialization process is performed during which certain information is exchanged between a new sensor and the controller 104. Due to the sensitive nature of the information being exchanged, and because an initialization phase sets up parameters for subsequent communication between a sensor (such as sensor 210 in FIG. 2) and a controller (such as controller 104 in FIGS. 1 and 2), this initialization process needs to be as secure as possible, while also maintaining flexibility, according to one or more embodiments of the invention.

Figure 2:
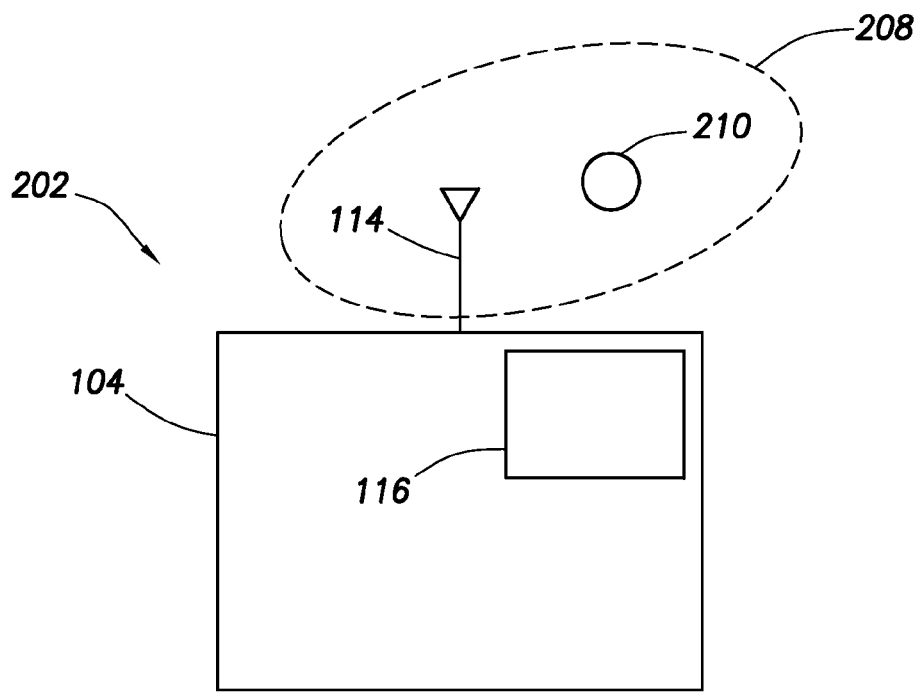
FIG. 2 shows a functional block diagram of a sensor system initialization configuration according to one or more embodiments of the invention.

FIG. 2 shows a functional block diagram of a sensor system initialization configuration according to one or more embodiments of the invention. Sensor system 202 includes sensor controller 104 having antenna 114 associated with near field communications range 208, within which sensor 210 is present. One skilled in the art will appreciate that near field communications restrict the distances over which the information being transmitted is able to be received.

By restricting the distance over which the transmitted initialization information travels, overall security is enhanced due to the reduced chance that an eavesdropper may intercept this information. Other methods of providing flexibility while maintaining enhanced security include using an intermediate device to transfer information between a controller (e.g., controller 104 in FIG. 2) and a sensor (e.g., sensor 210). Such an intermediate device could be in physical contact with either controller 104 or sensor 210 when transferring information to or from that respective device, or may use infrared or other means to transmit the information securely and wirelessly.

In one or more embodiments of the invention, normal power levels may be used to transmit initialization information while providing the desired security by restricting the size or number of the time periods within which the initialization information may be received by the controller. For example, there could be a predetermined time period after power is activated when controller 104 accepts initialization information from sensors (e.g., sensor 210). Or, there may be a user initiated time period during which initialization processes may occur. This initialization phase may also be performed using a physical connection (e.g., a wire) between the new sensor 210 and controller 104.

It is contemplated that at least two different sensor configurations may practice the invention. In a first configuration, according to one or more embodiments of the invention, where authentication of the data is the primary concern, information being transmitted between a sensor and a controller is digitally signed by the originator prior to being transmitted. Persons of ordinary skill in the art will readily appreciate that any suitable public key method may be employed to digitally sign the information, such as RSA (Rivest, Shamir, and Adleman) Algorithm, Elliptic Curve Cryptography (including using Diffie-Heliman-style shared keys), etc.

In a second configuration, in systems where data secrecy is an issue, encryption techniques may be employed within sensors and controllers to encrypt the information prior to transmission, and to decrypt encrypted information after receipt. When using encryption, the transmitted encrypted information is not easily able to be understood by unauthorized parties. Further, authenticity of the information may be verified when a receiving sensor or controller successfully decrypts the incoming information using the key presently being used in the system.

In one or more embodiments of the invention, a sensor system configuration includes one or more controllers (e.g., controller 104) and one or more sensors (e.g., sensor 210) each configured to transmit and receive encrypted data. Any of the various well known encryption algorithms may be employed, using public keys, pairwise keys, or group keys that provide such functionality.

During initialization, controller 104 receives network identity information, with optional additional information which may include information from sensor 210 as to its capabilities, location, security configuration, etc. Controller 104 adds this information into storage media 116 for later use.

At this time, controller 104 and sensor 210 each possess or need to generate a key pair for use when signing data, encrypting data, or both. A key pair typically includes a public key and a private key, with the private key being kept secret within the device that created the private key. The public key may be transmitted to others, for use when authenticating messages sent by the device that is associated with that public key. The public key may also be used by a receiving device when creating a pairwise key for use in encryption or for other reasons, as desired.

Further, controller 104 and sensor 210 swap public keys, which are unique to themselves, for later use when sensor 210 joins the sensor system 202 as an active sensor providing information. Further information as to the initialization process will be presented later.

Storage media 116 may include any type of non-transitory memory desired by a designer of sensor system 202, such as flash memory, electrically erasable programmable read only memory, volatile or nonvolatile random access memory, a hard disk drive, or any other suitable non-transitory storage media. Storage media 116 needs to be available to controller 104 but need not be located directly on controller 104.

Once the initialization process is complete, the controller optionally provides an acknowledgement to the new sensor 210 that it is now authorized to join the network to provide information and perform actions.

Figure 3:
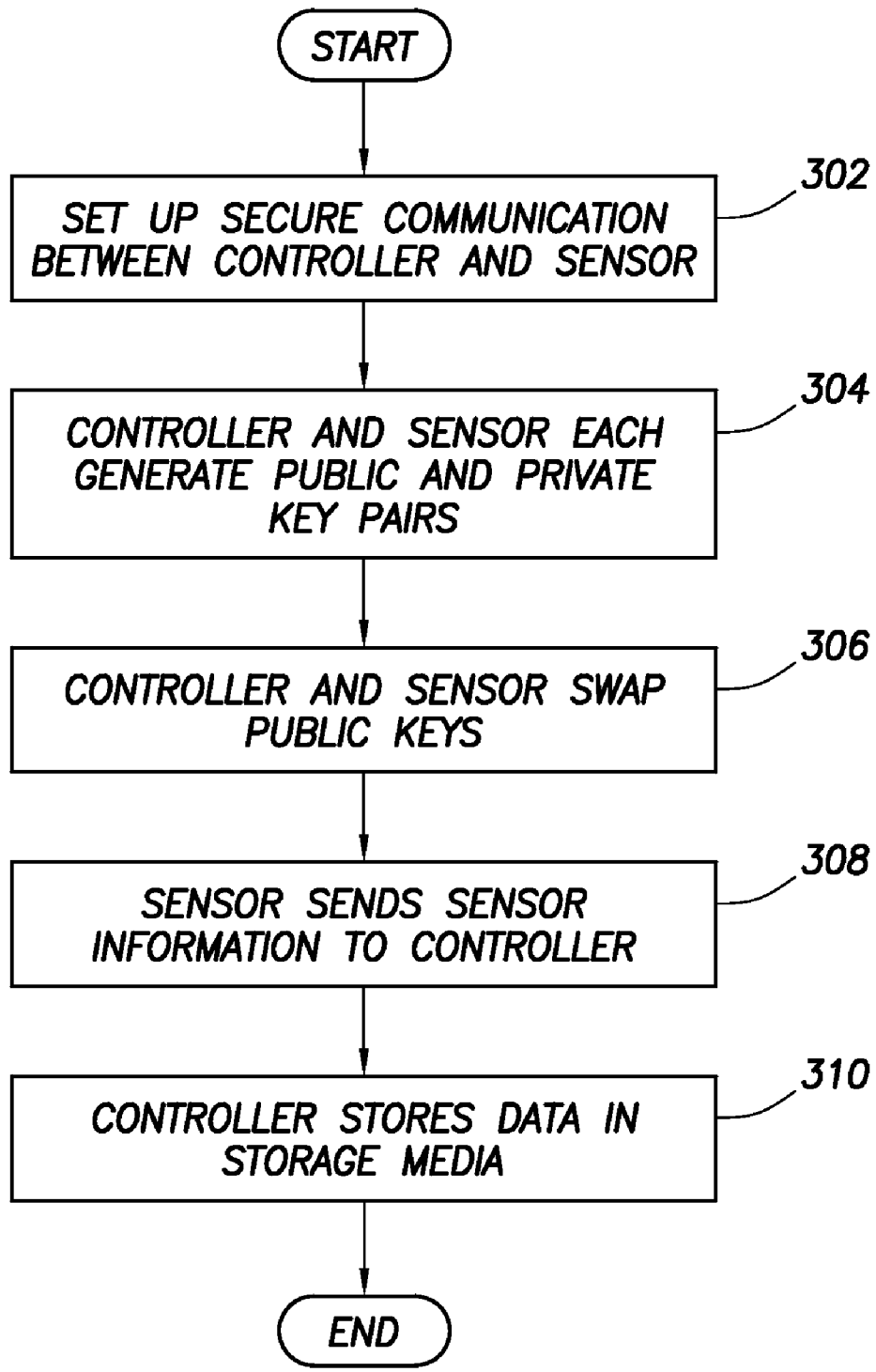
FIG. 3 shows a flowchart of technique according to one or more embodiments of the invention.

FIG. 3 shows a flowchart of a technique according to one or more embodiments of the invention. In one or more embodiments of the invention, the technique begins at block 302 when secure communication is established between the sensor (e.g., sensor 210) and the controller (e.g., controller 104 as shown in FIG. 2). As previously explained, this secure communication may be accomplished through the use of near field communication, infrared techniques, sound, etc.

At block 304, the controller and the sensor each create individual public and private key pairs using a public key method. Persons of ordinary skill in the art having the benefit of this disclosure will readily understand public key techniques that may be employed in the practice of the invention. Such technologies may include Elliptic Curve Cryptography, RSA Algorithm, etc. Some public key methods are primarily used for authentication (e.g., through the use of digital signatures) while others additionally provide data security through encryption of the information to be transmitted.

At block 306, the controller and the sensor swap public keys (i.e., each provides its own public key to the other). Initially, the sensor uses network identity information thought to be unique within the system. This network identity information may be pre-agreed, may be generated by the sensor, etc. Should it be desired to use different network identity information for the sensor, that network identity information may be generated by either the controller or the sensor and transmitted to the other at that time. Such network identity information may be a collection of bits arranged in a unique order, a crypto-based identifier, or another identifier desired by system designers. More information regarding network identity information and determining the uniqueness of such a network identity information will be discussed later.

Once public keys have been exchanged, sensor 210 and the controller 104 each have the information each needs to create a pairwise key which is used to authenticate information sent by one to the other. Other authentication means may be employed, such as the use of message authentication codes (MAC's). In one or more embodiments of the invention, information sent by the controller to sensors or by sensors to the controller includes a MAC.

If additional security is desired, pairwise keys suitable for encryption of data may also be created, derived from the public and private keys the sensor and the controller now possess.

At block 308, the sensor optionally sends data (e.g., sensor information) to the controller relating to the capabilities and configuration of the sensor (e.g., sensor 210). To ensure the authenticity of information being transmitted by either sensor 210 or controller 104 to the other, the information is digitally signed, a MAC is provided, or the information is optionally encrypted, depending on the needs of the system 102. The digital signature method may use the private key of the originator, or a pairwise key developed using the public key of the receiver and the private key of the originator. Persons of ordinary skill in the art having the benefit of this disclosure will readily appreciate that other key types or data authentication methods may be employed, while remaining within the scope and spirit of the invention.

At block 310, the controller stores at least a portion of the information received from the sensor in its storage media (e.g., storage media 116). In one or more embodiments of the invention, the information stored in the storage media includes one or more of a network identifier associated with the sensor (e.g., sensor 210) and used for identity and addressing, capability information, and configuration information.

Figure 4:
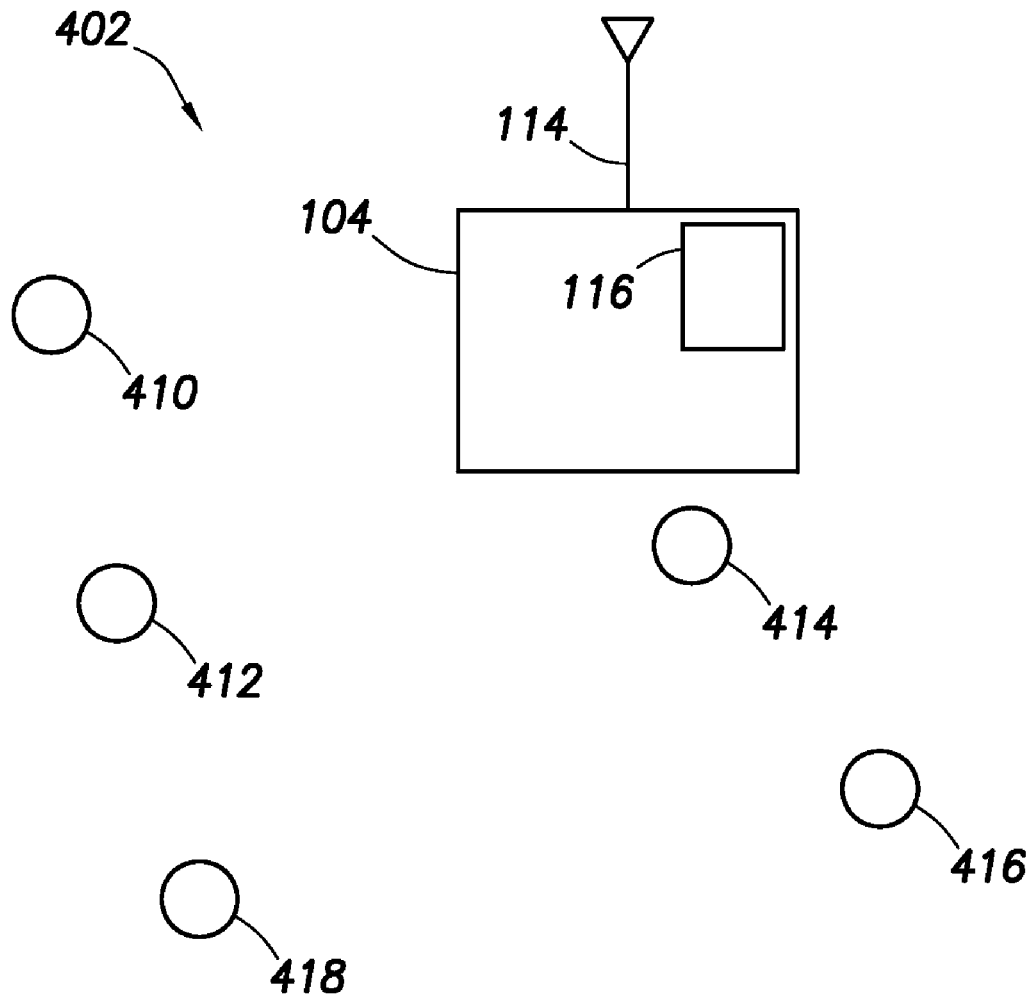
FIG. 4 shows a functional block diagram of a sensor system in accordance with one or more embodiments of the invention.

FIG. 4 shows a functional block diagram of a sensor system in accordance with one or more embodiments of the invention. In one or more embodiments of the invention, sensor system 402 includes controller 104 which itself includes storage media 116 and antenna 114. Sensor system 402 further includes sensors 410, 412, 414, 416, and 418.

In one or more embodiments of the invention, sensor 418 is within the RF range of controller 104. Thus, controller 104 receives information directly from sensor 418 without the use of intermediate devices to retransmit the information.

In one or more embodiments of the invention, sensor 418 is beyond the effective RF range of controller 104. When a controller, such as controller 104, and a sensor, such as sensor 418, are not within RF communication range, any information transmitted between controller 104 and sensor 418 is relayed using one or more intermediate devices, such as sensor 414.

Using one or more intermediate devices (e.g., such as sensor 414) to retransmit messages to or from controller 104 significantly increases the size of the area where sensors may be placed and still be able to provide information to and receive information from the controller 104.

Although FIG. 4 is depicted in two dimensions to minimize the complexity of this disclosure, persons of ordinary skill in the art having the benefit of this disclosure will readily recognize that using sensors or other devices as intermediate information relay points increases the size of the available space where sensors may be placed in three dimensions, because relay points may be placed anywhere within an RF range of another intermediate point.

Further, in one or more embodiments of the invention, multiple intermediate points may exist in an information path between a given sensor (such as sensor 414) and a controller (such as controller 104). Thus, information destined for a given device (e.g., sensor 210 or controller 104) may pass through several intermediate devices before arriving at its destination.

Figure 5:
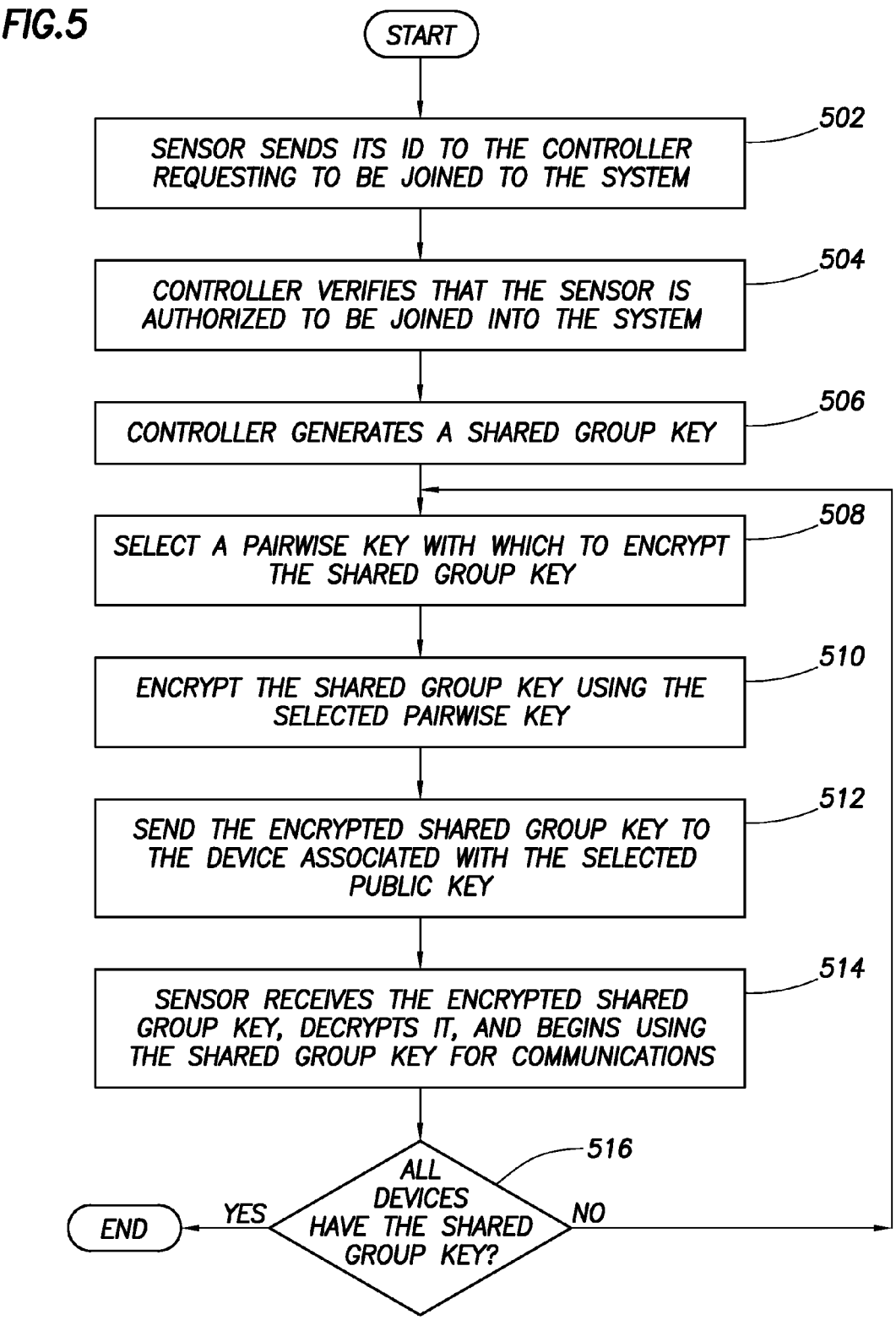
FIGS. 5, 6, and 7 show flowcharts of techniques according to one or more embodiments of the invention.

FIG. 5 shows a flowchart of a technique according to one or more embodiments of the invention. In one or more embodiments of the invention, sensor 418 is presently being added to sensor system 402, and has been initialized with the controller (such as controller 104 in FIG. 4), but has not yet been joined to a sensor system (such as sensor system 402 in FIG. 4) as an active sensor providing sensory data to controller 104.

Referring to FIG. 4 and FIG. 5 together, the technique begins at block 502 where sensor 418 sends information (including network identity information) to controller 104 requesting to be joined into the active sensor system, according to one or more embodiments of the invention. As previously discussed, such transmitted information is digitally signed, authenticated, or encrypted by the originator, to ensure verification and optional data secrecy, as desired.

At block 504, controller 104 verifies that sensor 418 is authorized to join the active sensor system. In one or more embodiments of the invention, the controller verifies authorization for sensor 404 to be in the sensor system by determining whether the network identity information for sensor 404 is present in a list stored in storage media (such as storage media 116 in FIG. 4). In one or more embodiments of the invention, the controller also verifies the join request itself by verifying the digital signature or MAC provided with the request, as necessary. If the authentication and authorization are verified, the controller proceeds with the join process.

At this time, controller 104 may also verify whether the network identity information for sensor 404 is unique within the sensor system, in order to ensure that messages may be directed to the proper sensor, and to ensure that the controller can accurately determine when a message has arrived from sensor 404. Additional information relating to identifier and network identity information uniqueness is provided later with respect to FIG. 7.

At block 506, the controller optionally generates a new group key that is shared by all devices for digitally signing or encrypting data within the sensor system, as may be appropriate. In one or more embodiments of the invention, the new group key is a hash of the pairwise keys of the various devices present in the sensor system. For example, in sensor system 402 having controller 104, and sensors 410, 412, 414, 416, and 418, the group key is of the form $H(P_{410}, P_{412}, P_{414}, P_{416}, P_{418})$, where H represents a hash function of the pairwise keys of the respective sensors. Persons of ordinary skill in the art having the benefit of this disclosure will readily understand that the hash function used in one or more embodiments of the invention may vary, as long as the result is a reliable group key.

Other methods for developing a group key may be employed. For example, in one or more embodiments of the invention, controller 104 determines a group key without using any of the pairwise keys, or alternatively using several of, but not all of the pairwise keys.

The development and use of a group key is optional, and is used primarily in those systems requiring higher levels of information security, such as when encryption of transmitted information is desired.

At block 508, the controller selects a pairwise key to use to encrypt the group key, for transmission to the sensor or other device that is associated with the selected pairwise key.

At block 510, the controller encrypts the group key using the selected pairwise key. At block 512, the controller sends the encrypted group key to the sensor or other device that is associated with the selected pairwise key.

At block 514, the sensor associated with the selected pairwise key receives the information, decrypts it and begins using the new group key for communications within the sensor system. At block 516, it is determined whether authorized devices exist which have not yet received the new group key. If so, the technique proceeds again at block 508 when a new pairwise key (associated with a sensor or other device that has not yet received the new group key) is selected for use when encrypting the group key.

By creating a new group key and sending that new group key to each device in the sensor system each time a new sensor is added, new sensors can participate in the sharing of data within the system with previously joined sensors and the controller. However, new sensors are not able to decrypt information which may have been received prior to the new group key being created, since the prior information was encrypted using a group key that the new sensor doesn't have. The condition of only allowing new sensors to decrypt and review information transmitted after they have been properly joined to the system is called backward secrecy, since the new sensor cannot read data that was produced prior to that sensor being accepted into the system, or backward in time.

At some time during the operation of the sensor system, it may become necessary for controller 104 to remove a sensor's (such as sensor 412) ability to communicate with other devices within the sensor system.

In one or more embodiments of the invention, a sensor is removed from the sensor system when a new group key is created without using the pairwise key of the sensor or other device being removed. That new group key is then distributed to all sensors or other active devices in the sensor system. Controller 104 further updates information in a list in storage media 116 to reflect that the removed sensor is no longer authorized to receive data. The sensor being removed can no longer participate in the sensor system or decrypt transmitted information because that removed sensor is not in possession of the new group key.

Figure 6:
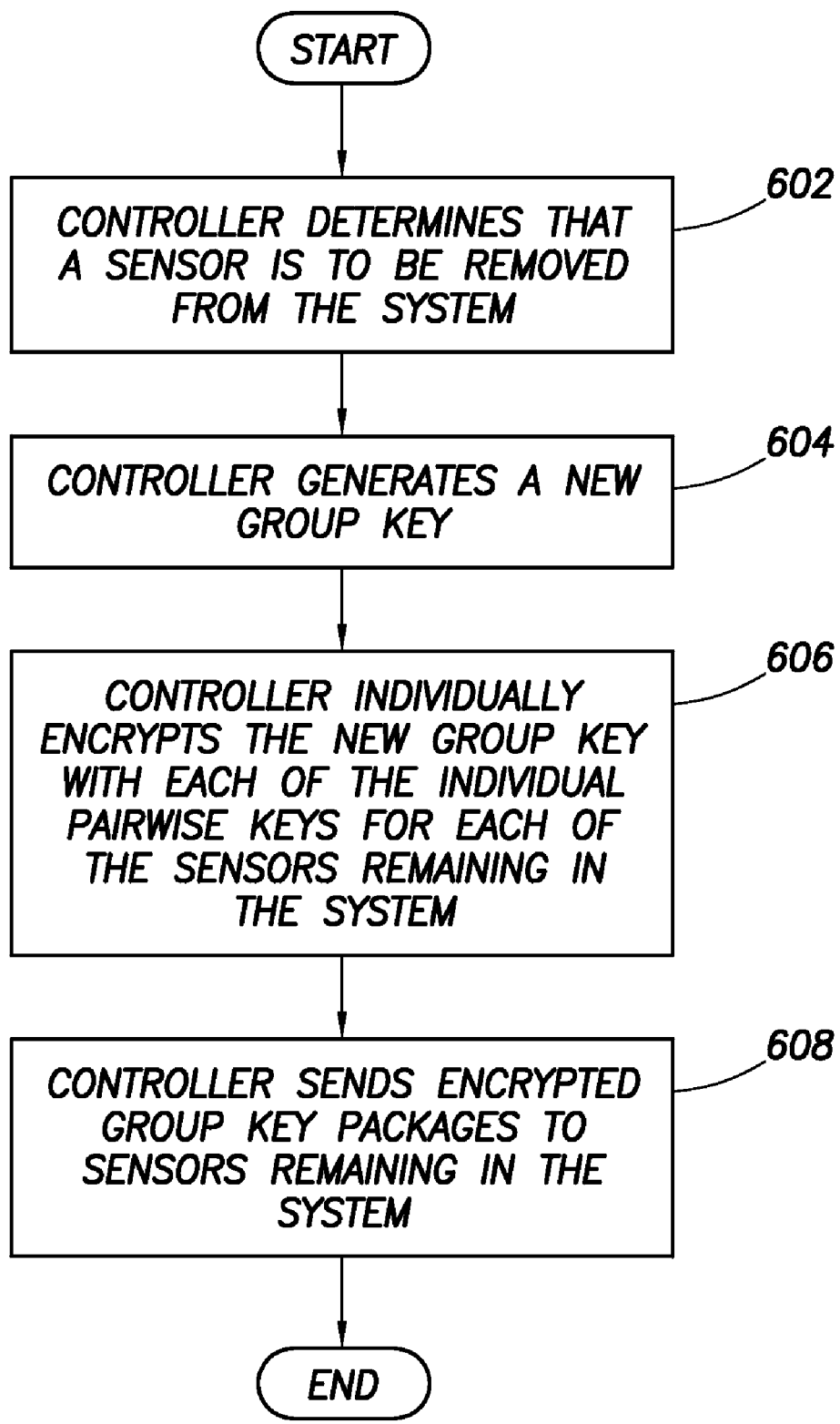

FIG. 6 shows a flowchart of a technique according to one or more embodiments of the invention. Referring to FIG. 4 and FIG. 6 together, the technique proceeds at block 602 when the controller (such as controller 104 in FIG. 4) determines that a sensor (such as sensor 412) needs to be removed from the sensor system (such as sensor system 402), according to one or more embodiments of the invention.

At block 604, the controller generates a new group key which, in one or more embodiments of the invention, is a hash of the pairwise keys associated with active devices in sensor system. Persons of ordinary skill in the art having the benefit of this disclosure will readily understand how to create a suitable group key for practicing the invention.

At block 606, the controller encrypts the group key using various pairwise keys associated with various sensors or other devices in the system. At block 608, the controller sends the various encrypted information packages to the various remaining sensors and other devices associated with the pairwise keys that were used to encrypt them. For example, controller 104 uses the pairwise key associated with sensor 412 to encrypt the group key, and sends that encrypted information to sensor 412, and so on for all other devices needing the new group key.

By creating a new group key each time a sensor is removed from the system, only sensors still within the system can participate in the sharing of data. Sensors leaving the system are not able to decrypt information encrypted using the new group key, because the later encrypted information is encrypted using a group key that the removed sensor does not have. The condition of not allowing old sensors to decrypt and review information after they have left the system is called forward secrecy, because an old sensor cannot read data that was produced after that sensor left the system, or forward in time.

Persons of ordinary skill in the art having the benefit of this disclosure will readily recognize that blocks 606 and 608 described herein may accomplish substantially similar tasks as previously described with respect to block 508, 510, 512, 514, and 516 of FIG. 5. Other techniques may also be used, while remaining within the scope and purpose of the invention.

When a new sensor joins the system, it is beneficial to ensure that the sensor is using a network identifier that is unique within the sensor system. Information below relates to a method for determining whether a new sensor the network identifier is using is unique, and how to manage when the identifier is not unique.

Figure 7:
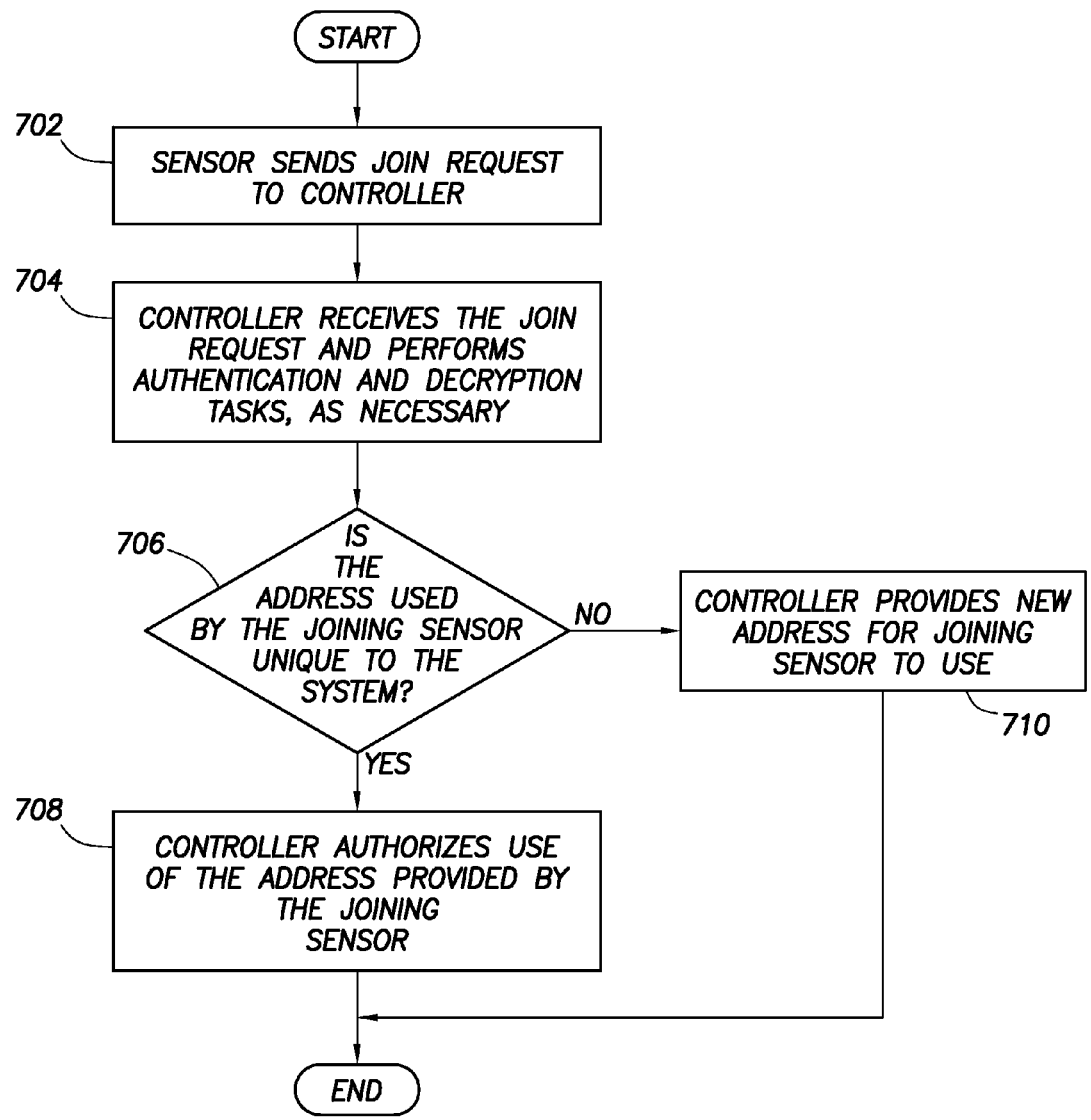

FIG. 7 shows a flowchart according to one or more embodiments of the invention. At 702, the new sensor sends a join request to the controller. This join request includes several fields of data, including an identifier indicating that the message is intended for the controller, an identifier indicating that the message is originated by the new sensor, and any other information deemed suitable for the join request.

In some systems, it may be desired that messages between sensors and controllers be signed, in order to provide authenticity. In one or more embodiments of the invention, the join request is digitally signed by the private key of the new sensor. In one or more embodiments of the invention, the join request is authenticated by a MAC using a pairwise key created using the public key of the controller and the private key of the new sensor.

In systems requiring information secrecy, portions of the join request (everything other than the identifier indicating that the message is intended for the controller) can be encrypted using a pairwise key created using the public key of the controller and the private key of the new sensor.

If the join request is being provided to the controller through a relay point, the new sensor may address the request to a second sensor (operating as a relay point) the new sensor "hears" and thus knows the second sensor is within range of, with the ultimate desired destination of the controller being provided as an unencrypted portion of the message being transmitted. When the relay point receives the message and determines that the message is intended for the controller, the relay point repackages the information and resends it to the controller.

At 704, the controller receives the join request and performs authentication and decryption tasks as necessary to be able to discern the contents of the message.

At 706, the controller determines whether the identity information (also used as the address of the new sensor) is unique within the sensor system. Uniqueness is necessary, in order to ensure that messages coming from the new sensor are properly attributed to that new sensor, and messages sent to the new sensor are properly delivered.

Since identity information, including network identifiers, is expected to be used frequently, such information should be relatively compact. In one or more embodiments of the invention, identity information is derived from the public key of the new sensor. In one or more embodiments of the invention, the identity information initially provided by the new sensor is a hash of the new sensor public key with a predetermined binary value. In one or more embodiments of the invention, that hash result is truncated to a number of bits desired for use within the system.

In order to determine uniqueness, the controller searches a list of sensors and other devices within the sensor system to determine whether the identity information is already in use with respect to another preexisting sensor. Such a list of sensors in the system may be present within storage media 116 of FIG. 1 as previously discussed, or may be stored at another location accessible to the controller 104 of FIG. 1.

If, at 706, the identity information received from the new sensor is unique within the sensor system 102, the method proceeds at 708 where the controller authorizes the use of that new sensor identity information.

If, at 706, the identity information received from the new sensor is not unique within the sensor system 102, the method proceeds at 710 where the controller generates new identity information for the new sensor, and provides that new identity information to the new sensor.

Generating new identity information may be accomplished in any desirable manner appropriate for the sensor system employing the invention. In one or more embodiments of the invention, the new identity information is derived from the public key of the new sensor. In one or more embodiments of the invention, the new identity information is a hash of the public key with a predetermined binary value.

In one or more embodiments of the invention, if the original identity information received from the new sensor is a hash of the public key with a predetermined binary value, the new identity information generated by the controller is a hash of the public key with the predetermined binary value incremented by a predetermined amount.

In one or more embodiments of the invention, the hash result is truncated to a number of bits desired for use within the system. In one or more embodiments of the invention, the controller generates new identity information itself, with no relation to the old identity information.

Following the generation of new identity information, the controller transmits the new identity information to the new sensor, if necessary. Because the identity information previously provided by the new sensor is not unique within the system, sending the new identity information back to the new sensor using the originally-provided identity information likely results in more than one device receiving that new identity information. In this case, however, the controller may digitally sign the response using the public key of the new sensor. The other sensor having the duplicate identity can't verify the response message, because the other sensor doesn't have the private key necessary to verify the message. Alternatively, the response is authenticated by a MAC using a pairwise key created using the public key of the new sensor and the private key of the controller. When that authenticated response is received by the second sensor having the same identity, the second sensor is not able to verify the response, because the second sensor doesn't have access to the proper pairwise key needed for the verification.

In order to distinguish the message as being directed to the new sensor, the controller may partly encrypt the new identity information using the pairwise key associated with the new sensor. Thus, the encrypted information is only useful to the new sensor, because the other sensor having the same address is not able to decrypt the partially-encrypted information. Alternatively, the controller may use a hash of the new sensor public key with a predetermined binary value as a temporary identity for this message only, assuming the new sensor has been configured to listen at this temporary address until the joining process is complete.

If new identity information is being provided to the new sensor through a relay point, the controller may address the new sensor message first to the relay point, with the ultimate desired destination being provided as a portion of the message being transmitted. When the relay point receives the message and determines that the message is intended for the new sensor, the relay point repackages the information and resends it to the new sensor, using the old identity information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for secure configuration of a sensor system comprising a sensor controller and a plurality of sensors, the method comprising:
    generating, by the sensor controller, an old group key shared by the plurality of sensors, wherein the old group key incorporates a plurality of network identify information of the plurality of sensors for securely transmitting digital data within the sensor system;
    sending, by the sensor controller, the old group key to each of the plurality of sensors;
    receiving, at the sensor controller, a join request from a new sensor to join the plurality of sensors, wherein the join request comprises a first authentication means and a first network identity information identifying the new sensor, wherein the first network identity information comprises a hash of a public key with a predetermined binary value;
    truncating the hash to a number of bits desired for use within the sensor system to generate a truncated hash;
    determining, by the sensor controller, whether the first network identity information provided by the new sensor is already associated with a sensor among the plurality of sensors;
    generating, by the sensor controller and in response to determining that the first network identity information is already associated with the sensor among the plurality of sensors, a second network identity information for identifying the new sensor, wherein the second network identity information comprises the truncated hash of the public key incremented by a predetermined amount;
    generating, by the sensor controller and in response to generating the second network identity information for identifying the new sensor, a new group key shared by the plurality of sensors and the new sensor, wherein the new group key incorporates the plurality of network identify information of the plurality of sensors and the second network identify information of the new sensor for securely transmitting the digital data within the sensor system and replaces the old group key shared by the plurality of sensors without the new sensor; and
    sending, by the sensor controller:
        the second network identity information and the new group key to the new sensor, wherein the second network identity information replaces the first network identity information for the new sensor; and
        the new group key to each of the plurality of sensors.

2. The method of claim 1, wherein the first authentication means comprises a digital signature created using a private key associated with the new sensor.

3. The method of claim 1, wherein the second network identity information comprises a second authentication means comprising a message authentication code using a pairwise key, wherein the pairwise key is created using a public key associated with the new sensor and a private key associated with the sensor controller.

4. The method of claim 1, wherein the first authentication means comprises a message authentication code using a pairwise key, wherein the pairwise key is created using a private key associated with the new sensor and a public key associated with the sensor controller.

5. The method of claim 1, wherein the second network identity information comprises a second authentication means comprising a digital signature created using a public key associated with the new sensor.

6. The method of claim 1, wherein at least a portion of the join request is encrypted using a key derived from a pairwise key created using a private key associated with the new sensor and a public key associated with the sensor controller.

7. The method of claim 1, wherein the new group key is shared by the plurality of sensors and the new sensor for digitally encrypting data within the sensor system.

8. A sensor system comprising:
a plurality of sensors; and
a sensor controller accessing a memory, wirelessly coupled to the plurality of sensors, and configured to:
generate an old group key shared by the plurality of sensors, wherein the old group key incorporates a plurality of network identify information of the plurality of sensors for securely transmitting digital data within the sensor system;
send the old group key to each of the plurality of sensors;
receive a join request from a new sensor to join the plurality of sensors, wherein the join request comprises a first authentication means and a first network identity information identifying the new sensor, wherein the first network identity information comprises a hash of a public key with a predetermined binary value;
truncate the hash to a number of bits desired for use within the sensor system to generate a truncated hash;
determine whether the first network identity information provided by the new sensor is already associated with a sensor among the plurality of sensors;
generate, in response to determining that the first network identity information is already associated with a sensor among the plurality of sensors, a second network identity information for identifying the new sensor, wherein the second network identity information comprises the truncated hash of the public key incremented by a predetermined amount;
generate, by the sensor controller and in response to generating the second network identity information for identifying the new sensor, a new group key shared by the plurality of sensors and the new sensor, wherein the new group key incorporates the plurality of network identify information of the plurality of sensors and the second network identify information of the new sensor for securely transmitting the digital data within the sensor system and replaces the old group key shared by the plurality of sensors without the new sensor; and
send:
the second network identity information and the new group key to the new sensor, wherein the second network identity information replaces the first network identity information for the new sensor; and
the new group key to each of the plurality of sensors.

9. The sensor system of claim 8, wherein the first authentication means comprises a digital signature created using a private key associated with the new sensor.

10. The sensor system of claim 8, wherein the second network identity information comprises a second authentication means comprising a message authentication code using a pairwise key, wherein the pairwise key is created using a public key associated with the new sensor and a private key associated with the controller.

11. The sensor system of claim 8, wherein the first authentication means comprises a message authentication code using a pairwise key, wherein the pairwise key is created using a private key associated with the new sensor and a public key associated with the controller.

12. The sensor system of claim 8, wherein the second network identity information comprises a second authentication means comprising a digital signature created using a public key associated with the new sensor.

13. The sensor system of claim 8, wherein at least a portion of the join request is encrypted using a key derived from a pairwise key created using a private key associated with the new sensor and a public key associated with the controller.
generating, by the sensor controller, an old group key shared by the plurality of sensors, wherein the old group key incorporates a plurality of network identify information of the plurality of sensors for securely transmitting digital data within the sensor system;
sending, by the sensor controller, the old group key to each of the plurality of sensors;
receiving, at the sensor controller, a join request from a new sensor to join the plurality of sensors, wherein the join request comprises a first authentication means and a first network identity information identifying the new sensor, wherein the first network identity information comprises a hash of a public key with a predetermined binary value;
truncating the hash to a number of bits desired for use within the sensor system to generate a truncated hash;
determining whether the first network identity information provided by the new sensor is already associated with a sensor among the plurality of sensors;
generating, in response to determining that the first network identity information is already associated with a sensor among the plurality of sensors, a second network identity information for identifying the new sensor, wherein the second network identity information comprises the truncated hash of the public key incremented by a predetermined amount;
generating, by the sensor controller and in response to generating the second network identity information for identifying the new sensor, a new group key shared by the plurality of sensors and the new sensor, wherein the new group key incorporates the plurality of network identify information of the plurality of sensors and the second network identify information of the new sensor for securely transmitting the digital data within the sensor system and replaces the old group key shared by the plurality of sensors without the new sensor; and
sending, by the sensor controller:
the second network identity information and the new group key to the new sensor, wherein the second network identity information replaces the first network identity information for the new sensor; and
the new group key to each of the plurality of sensors.

14. A non-transitory storage medium having executable code stored thereon that when executed by a computer system implements a method for secure configuration of a sensor system comprising a sensor controller and a plurality of sensors, the method comprising:
generating, by the sensor controller, an old group key shared by the plurality of sensors, wherein the old group key incorporates a plurality of network identify information of the plurality of sensors for securely transmitting digital data within the sensor system;
sending, by the sensor controller, the old group key to each of the plurality of sensors;
receiving, at the sensor controller, a join request from a new sensor to join the plurality of sensors, wherein the join request comprises a first authentication means and a first network identity information identifying the new sensor, wherein the first network identity information comprises a hash of a public key with a predetermined binary value;
truncating the hash to a number of bits desired for use within the sensor system to generate a truncated hash;

determining whether the first network identity information provided by the new sensor is already associated with a sensor among the plurality of sensors;

generating, in response to determining that the first network identity information is already associated with a sensor among the plurality of sensors, a second network identity information for identifying the new sensor, wherein the second network identity information comprises the truncated hash of the public key incremented by a predetermined amount;

generating, by the sensor controller and in response to generating the second network identity information for identifying the new sensor, a new group key shared by the plurality of sensors and the new sensor, wherein the new group key incorporates the plurality of network identify information of the plurality of sensors and the second network identify information of the new sensor for securely transmitting the digital data within the sensor system and replaces the old group key shared by the plurality of sensors without the new sensor; and sending, by the sensor controller:

the second network identity information and the new group key to the new sensor, wherein the second network identity information replaces the first network identity information for the new sensor; and the new group key to each of the plurality of sensors.

15. The storage medium of claim 14, wherein the first authentication means comprises a digital signature created using a private key associated with the new sensor.

16. The storage medium of claim 14, wherein the second network identity information comprises a second authentication means comprising a message authentication code using a pairwise key, wherein the pairwise key is created using a public key associated with the new sensor and a private key associated with the sensor controller.

17. The storage medium of claim 14, wherein the first authentication means comprises a message authentication code using a pairwise key, wherein the pairwise key is created using a private key associated with the new sensor and a public key associated with the sensor controller.

18. The storage medium of claim 14, wherein the second network identity information comprises a second authentication means comprising a digital signature created using a public key associated with the new sensor.

\* \* \* \* \*